United States Patent [19]

O'Neill et al.

[11] Patent Number: 5,116,411
[45] Date of Patent: May 26, 1992

[54] PRINTING INK

[75] Inventors: Michael W. O'Neill, Abbotsford, Canada; Gerald Sugerman, Allendale, N.J.

[73] Assignee: Topez Company, British West Indies

[21] Appl. No.: 456,112

[22] Filed: Dec. 22, 1989

[51] Int. Cl.⁵ .............. C09D 11/00; C09D 11/08
[52] U.S. Cl. ........................ 106/22; 106/30; 106/32; 106/447; 106/446
[58] Field of Search ........... 106/447, 446, 448, 30, 106/32, 22

[56] References Cited

U.S. PATENT DOCUMENTS

| | | | |
|---|---|---|---|
| 4,253,377 | 3/1981 | Emmons et al. | 106/30 |
| 4,556,427 | 12/1985 | Lewis | 106/32 |
| 4,634,785 | 1/1987 | Sugerman et al. | 106/299 |
| 4,659,848 | 4/1987 | Kay et al. | 106/20 |

OTHER PUBLICATIONS

G. Sugerman et al., "Corrosion Resistant One Hundred Percent Solids, Environmentally Sound Coatings," Water-Borne & Higher-Solids Coatings Symposium, Feb. 3-5, 1988, New Orleans, La.
G. Sugerman et al., "Enhanced Bonding of Fiber Reinforcements to Thermoset Resins," 33rd International SAMPE Symposium, Mar. 7-10, 1988, Anaheim, Calif.
G. Sugerman et al., "Alkoxy Titanates and Zirconates as Corrosion Inhibitors," *Modern Paint and Coatings*, Jun. 1988.
G. Sugerman et al., "Heavy Metal Free, High Solids Anticorrosive Baked Coatings," SAMPE Technical Conference, Sep. 28, 1988, Minneapolis, Minn.

*Primary Examiner*—William R. Dixon, Jr.
*Assistant Examiner*—Timothy D. Saunders
*Attorney, Agent, or Firm*—Hopgood, Calimafde, Kalil Blaustein & Judlowe

[57] ABSTRACT

The addition of an organophosphato-titanate and an organophosphato-zirconate to printing ink improves the adhesivity of the ink to a variety of substrates. A concentrate of the two organo-metallic components may be added to a conventional ink or added to the ink formulation during the ink's initial preparation. In addition to improving adhesivity, the additives reduce drying time, permit more rapid processing, and minimize the need for solvent diluents.

21 Claims, No Drawings

PRINTING INK

BACKGROUND OF THE INVENTION

In the art of printing, inks which can be efficiently used on all surfaces have long been sought. Generally speaking, the more cumbersome printing processes such as screen printing, hot stamping, and rotogravure have been required where it is desired to print on non-porous surfaces. High speed economical processes such as lithography have not proven dependable on such surfaces. In Leach et al., *The Printing Ink Manual*, Van Nostrand Reinhold (International) Co., Ltd., 4th Ed. (1988) on page 310, it is noted that: ". . . the main use of litho printing is on paper and board substrates. Attempts to formulate a wide range of wholly satisfactory inks for film, plastics, and foil substrates are impeded by litho restrictions. This is not to say that such materials cannot be printed by lithography, but achieving full ink adhesion on the stock is often more problematic than with gravure, screen, or flexo systems."

Overcoming the problem of adhesion on all stocks would obviously be desirable so that a particular printing installation could treat all types of substrates. The major difficulty has been to formulate an ink which effectively adheres to non-porous substrates. In addition, it is desirable to have inks which can be applied as a thin film, dry quickly upon application, and also possess the apparently contradictory property of slow deep drying so that they will not clog printing equipment by drying on the parts of the press prematurely. To achieve these ends, it is desirable to minimize the use of lithographic ink solvents which are added to inks to obtain the necessary low viscosity. Solvents prevent the high loading of solids, therefore requiring the application of thicker films to the substrate to gain the necessary opacity. Also, solvents are increasingly an environmental problem and, while they improve the flow properties, they impede the drying process.

Inks meeting these criteria have heretofore not been attainable.

Certain efforts have been made to increase the pigment loading of inks by the addition of organo-titanate compounds. The use of organo-titanates and/or organo-zirconates in paints and other coating compositions has been described in the literature.

BRIEF DESCRIPTION OF THE INVENTION

The subject invention relates to additive concentrates, inks containing such concentrates, a method of printing with such inks, and printed articles formed by the printing process. The additive concentrate of the invention contains an organo-titanate component and an organo-zirconate component, as hereinafter defined, a resin vehicle and/or a conventional drier. Both the organo-titanate and the organo-zirconate must be present to achieve the advantages of the invention. These organo-metallic compounds must contain phosphato linkages and may generally be described as organophosphato-titanates and organophosphato-zirconates.

In one embodiment of the invention, the ink may be specially formulated with the organo-metallic compounds with or without the presence of conventional driers such as the metal soaps of long chain fatty acids (e.g. cobalt or manganese naphthenates) to form a high quality ink having the ability to be efficiently applied to substantially any substrate by lithographic processing to produce a printed article wherein the dried ink is stubbornly adherent.

In addition to adhesion, the compositions of the invention form inks which may be applied in thin films so as to permit quicker drying and faster printing. Drying rates are reduced from the conventional 12 to 48 hours to as little as 5 minutes. The printing processes can be increased from the conventional 5,000 to 6,000 sheets per hour to 12,000 sheets per hour. Surprisingly, these fast-drying inks do not dry prematurely on the equipment because of slow deep dry times. Accordingly, press stability can be achieved.

Another advantage of the instant invention is that the necessity for the conventional cobalt and manganese fatty acid driers is reduced or eliminated. These materials are often detrimental to adhesion.

By incorporating the unique combination of organo-metallic ingredients, much higher loadings of pigments can be achieved. This feature, coupled with reducing the viscosity of the mixture without the need of solvents, permits the application of thinner films while still achieving outstanding opacity. By eliminating solvents, environmental problems are overcome and the inks achieve good flow properties, that is, they wet the substrate easily, permitting rapid drying and even the use of lower viscosity resin vehicles.

DETAILED DESCRIPTION OF THE INVENTION

To achieve the outstanding results of the instant invention, at least one organo-titanate compound and at least one organo-zirconate compound must be used. These compounds may be represented by the following formulas:

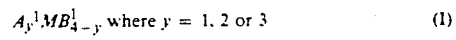 (I)

where $y = 1, 2$ or $3$

 (II)

 (III)

 (IV)

 (V)

 (IV)

where $M = Ti$ or $Zr$;

$A^1 = (RO)_a$, wherein R is an unsubstituted or ether-substituted alkyl, alkenyl, or aralkyl group having less than 20 carbon atoms;

$A^2 = -O(CR^1R^2)_b(CO)_cO-$, wherein $R^1$ and $R^2$ are independently selected from hydrogen and unsubstituted or ether-substituted alkyl, alkenyl, aralkyl, aryl or alkaryl having less than 20 carbon atoms, b is 1 or 2 and c is 0 or 1;

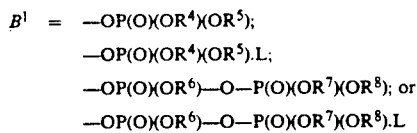

wherein $R^4$ and $R^5$ are independently selected from unsubstituted or ether-substituted alkyl, alkenyl, aralkyl, aryl or alkaryl having less than 20 carbon atoms per molecule; $R^6$, $R^7$ and $R^8$ are the same as $R^4$ and $R^5$ except that one and only one of $R^6$, $R^7$ and $R^8$ is hydrogen; and L is a diester phosphite having less than 40 carbon atoms or an unsaturated tertiary amine or derivative thereof having less than 20 carbon atoms; and $B^2$ is —OP(O)(OR$^3$)OP(O)(OR$^3$)O— wherein R$^3$ is as defined for R$^4$ and R$^5$ above.

Representative compounds are shown in the following table:

TABLE A

| Code | Compound | Structural Formula |
|---|---|---|
| aa) | Titanium IV ethanediolato, bis(dioctyl) diphosphato-O adduct with 2 moles N,N'-dimethyl-aminoethyl(2-methyl)propenoate | (CH$_2$O)$_2$Ti[OP(O)(OH)OP(O)—(OC$_8$H$_{17}$)$_2$]$_2$.2(CH$_3$)$_2$NC$_2$H$_4$OC—(O)C(CH$_3$)=CH$_2$ |
| ab) | Titanium IV bis bis (2,2-propenolatomethyl) butanolato cyclo(dioctyl) diphosphato-O,O | [(CH$_2$=CHCH$_2$O)$_2$(C$_2$H$_5$)CCH$_2$O]$_2$Ti[OP(O)(OC$_8$H$_{17}$)OP(O)—(OC$_8$H$_{17}$)O] |
| ac) | Zirconium IV bis bis (2,2-propenolatomethyl)butanolato cyclo(dioctyl) diphosphato-O,O. | [(CH$_2$=CHCH$_2$OCH$_2$)$_2$(C$_2$H$_5$)CCH$_2$—O]Zr[OP(O)(OC$_8$H$_{17}$)OP(O)—(OC$_8$H$_{17}$)O] |
| ad) | Titanium IV oxo ethylenediolato, bis (butyl, methyl) di phosphato-O adduct with 2 moles of dioctyl hydrogen phosphite | [OCH$_2$C(O)O]Ti[OP(O)(OR$^6$)OP—(O)(OR$^7$)(OR$^8$)].2P(H)(O)—(OC$_8$H$_{17}$)$_2$ wherein R$^6$, R$^7$, and R$^8$ are one each of hydrogen, methyl and butyl ligands [(H), (CH$_3$) and (C$_4$H$_9$)] |
| af) | Zirconium IV (2,2-dimethyl)propanediolato, bis(dioctyl) diphosphato-O adduct with 2 moles of N,N dimethyl-amino-propyl (2-methyl) propenoamide | (CH$_3$)$_2$C(CH$_2$O)$_2$Zr[OP(O)—(OR$^6$)OP(O)(OR$^7$)(OR$^8$)]$_2$.2(CH$_3$)$_2$N(CH$_2$)$_3$NHC(O)C(CH$_3$)=CH$_2$ wherein two of R$^6$, R$^7$ and R$^8$ are octyl and one is hydrogen [2(C$_8$H$_{17}$) and one (H)] |
| ag) | Titanium IV bis (2,2-propenolatomethyl) butanolato, tris (dioctyl) phosphato-O | [(CH$_2$=CHCH$_2$OCH$_2$)$_2$(C$_2$H$_5$)—CCH$_2$O]Ti[OP(O)(OC$_8$H$_{17}$)]$_3$ |
| ah) | Titanium IV bis(2,2-propenolatomethyl) butanolato, tris (dioctyl) diphosphato-O adduct with 3 moles of di 2-phenoxyethyl, hydrogen phosphite | [(CH$_2$=CHCH$_2$OCH$_2$)$_2$(C$_2$H$_5$)—CCH$_2$O]Ti[OP(O)(OR$^6$)OP(O)—(OR$^7$)(OR$^8$)]$_3$.3HP(O)(OC$_2$H$_4$O—C$_6$H$_5$)$_2$ wherein two of R$^6$, R$^7$ and R$^8$ are octyl and one is hydrogen |
| aj) | Zirconium IV bis 5-phenoxy-3-(oxy) pentanolato, bis (diphenyl) phosphato-O | [C$_6$H$_5$O(C$_2$H$_4$O)$_2$]$_2$Zr[OP(O)—(OC$_6$H$_5$)$_2$]$_2$ |

The preparation of the above organo-metallic compoudns can be readily accomplished by those skille din the art. Reference is made to U.S. Pat. No. 4,277,415 for the preparation of the above adducts of pyrophosphato-titanates and amines and to U.S. Pat. Nos. 4,087,402, 4,122,062 and 4,634,785 for the preparation of organotitanate diester pyrophosphates and diester phosphates. The disclosure of these patents is incorporated by reference herein. It will be understood that the preparation of the organo-zirconates is analogous to the preparation of the organo-titanates.

In the additive concentrate the ratio of the organo-titanates to the organo-zirconates will broadly be in the range from 10:1 to 1:10, preferably from 5:1to 1:5. To incorporate the concentrate into the ink, the organo-metallic mixture is dissolved or dispersed in resin or resin precursor. In such instances, the organo-metallic compounds would in total comprise from about 1 to 30%, preferably 5 to 10%, in the vehicle. If desired, driers and other additives may be added to the concentrate. Based on metal, from 0.5 to 20%, preferably from 2 to 15%, of drier is present.

Rather than using the additive package, the ink may be formulated directly. In either case, the finished ink may contain the conventional constituents, namely, pigments, resin/vehicles, solvents/diluents, and additives.

Generally, the pigments which may be used include CI Pigment Yellows 12 and 13, CI Pigment Red 57:1, CI Pigment Blue 15:3, and CI Pigment Black 7 (usually toned with CI Pigment Blue 18). Other yellows which may be used include CI Pigment Yellow 17 and, for limited application, the Hansa yellows. Oranges useful in the practice of the invention are CI Pigment Orange 13 and 34. Other reds include the CI Pigment Reds 2, 4, 48.2, 53.1, and 81. Other blues include CI Pigment Blues 1, 15, and 15.1 and, to a limited extent, CI Pigment Blue 27 (Iron Blue). Violets useful in lithography are CI Pigment Violet 1 (PMTA Rhodamine) and CI Pigment Violets 3 and 23. Greens include CI Pigment Greens 1, 2, and 7 and for white CI Pigment White 6 (Rutile grades) and as an extender CI Pigment White 18.

The resin/vehicles conventionally used as litho-ink vehicles have application in the instant invention. The class of oleoresinous (hard resin and drying oil alkyds) systems used to produce quick set, heat set, and oxidation drying inks are the most common. Other oxidative systems based on epoxy, vinyl esters and unsaturated polyesters and polyurethane resins may be used. These require the use of drier to accelerate the oxidation. Alkyd vehicles are preferred. In addition, acrylate systems using radiation or thermal cures can be employed.

Non-oxidative drying systems including thermoplastic inks, e.g., acrylates and saturated polyurethanes and polyesters, though less common, may also be enhanced by applying the teaching of the invention. The resins dry by solvent evaporation and do not use driers.

Examples of solvents/diluents which may be used in the instant invention for litho printing are those having a very weak solvent power such as high boiling petroleum fractions. Small proportions of stronger solvents which may have alcohol or ester functionalities such as tridecanol may be used as cosolvents. As noted previously, it is an object of the instant invention to reduce or eliminate these solvents.

With respect to additives, these may include driers, waxes, antioxidants, anti-setoff compounds, litho additives and rheology modifiers. Driers are generally regarded as the most important of the additives in litho ink. The oxygen-induced polymerization of drying oils and drying oil-modified alkyds is accelerated by the incorporation of these compounds. At the present time, cobalt and manganese are the principal metals in use and are used in the form of soaps of long chain carboxylic acids. Because these materials are solid and used in small quantities, they are normally added in the form of relatively dilute solutions in hydrocarbon solvents for ease of handling. In addition, cross-linking accelerators such as trimethylol-propane triacrylate and/or dilute triallyl trimelitate may be employed in amounts up to 7 wt % based on ink solids.

Conventional waxes may be added to the ink to produce good surface slip for inline handling and scratch resistance and rub resistance to meet end use requirements. The major types of waxes used are polyethylene and polytetrafluoroethylene. These may be used alone or in combination.

Antioxidants are generally employed to lengthen the skinning time to give overnight stability on the inking rolls. The main types of antioxidants are oximes, as for example methylethyl ketoxime, phenolic-types such as butylated hydroxy-toluene and quinones such as hydroquinone. Naturally, the amount of antioxidant and the type selected must be carefully balanced so as to avoid slowing the drying of the ink upon application to the substrate.

In addition to the foregoing, any of the other conventional litho additives and rheology modifiers may be added to the ink or the additive concentrate of the instant invention. Examples of the former are soluble salts of tartaric acid and ethylene diamine tetra-acetic acid and examples of the latter are aluminum gellants. These assist the formulator in achieving the exact balance of viscosity, yield value, thixotropy and tack that is desired. In addition, various clays such as mountmorillonite clays, fumed silica, polyamides and aluminum chelates and micronized hydrocarbon resins are useful.

A particularly useful additive concentrate of the invention includes from 5 to 10% of each of the organo-metallic compounds, and 2 to 15%, based on metal, of the drier or driers in a resin or resin precursor. Manganese is not essential and to a certain extent is undesirable, since it discolors PVC-type film and degrades cellulose.

Generally speaking, in the ink formulation the resin vehicle comprises from 10 to 50%, preferably from 20 to 50%. The organo-metallic compounds each comprise from 0.1 to 3% and most preferably from 0.5 to 1%.

Unless a clear ink is desired, in which instance no pigment is used, up to 80% of pigment may be used. Generally from 15 to 40% pigment is used in lithography. Diluents or solvents may be present in the ink or the additive concentrate, but these are not necessary. In conventional lithography, up to 40% may be present; conventionally from 10 to 20% is used.

The elimination and reduction of solvents is a marked advantage of the inks of the instant invention. Without solvents, solid levels can be enhanced, better coating can be achieved, and adhesion can be improved. Naturally, better drying times and higher press speeds are also achievable. As noted above, solvents are an environmental hazard, because of both their volatility and their appearance in discharge streams.

Still another advantage of the instant invention is that the inks can be used over a broad range of atmospheric conditions. For example, it has been noted that, even at humidity as high as 95%, these inks have the ability to wet the substrate and properly dry.

It is a particularly preferred embodiment of the invention to develop an ink which is completely free of fatty acids. Fatty acids are often introduced into the system, since these serve as solvent for the metal soap driers. Driers which may also be used include metal carboxylic acids of cobalt, lead, manganese, tin and the rare earth metals. The elimination of the fatty acids accelerates drying, improves adhesion, and permits the use of lower molecular weight resin vehicles. For example, whereas the conventional alkyd solvent diluents have a viscosity of from 100 to 40,000 centipoise, typically 5,000, in the practice of the invention alkyds having a viscosity of from 2500 to 10,000 centipoise, preferably about 4000 centipoise, may be advantageously used.

The inks prepared in accordance with the instant invention can be used on substantially all types of substrates and therefore markedly broaden the application of lithography. In addition to the porous substrates such as paper and board, packaging films such as regenerated cellulose, nitrocellulose, coated films, polyolefin films such as polyethylene and polypropylene, polyvinylchloride films, nylon, polyester, aluminum foil, and metallized substrates may be satisfactorily printed.

In order to more clearly describe the instant invention, attention is directed to the following examples:

EXAMPLE I

A series of additive concentrates were prepared for addition to a conventional commercial blue ink to demonstrate adhesion, drying time and rub resistance. The composition of the ink is as follow:

| Parts by Wt | |
|---|---|
| 14 | Modified Alkyd Resin (Ecovar P.D.Q. Q.S. Gell) |
| 14 | Chinawood Gloss Varnish |
| 54 | Phthalo Blue Pigment Concentrate |
| 2 | Polyethylene (11) Glycol (Diethylene PE-11) |
| 1 | Surfactant (Diafluron PF-1) |
| 1 | 6% Cobalt Naphthanate Drier (Linall P.I.) |
| 1 | Manganese Versalate |
| .40 | Barytes (Bartyl F-2) |
| 1 | Tridecyl Alcohol |
| 11.60 | Medium Boiling Solvent f.p. 50° C. (Magiesol #52 Oil) |

Other additives were also prepared to serve as controls. The compositions are shown in the following table. The organo-metallic compounds, designated aa to aj, are described in Table A above.

TABLE I

| | Components, Parts by Weight | | | | | |
|---|---|---|---|---|---|---|
| | 1 | 2 | 3 | 4 | 5 | 6 |
| Additive Concentrate | | | | | | |
| A | aa/1 | ab/1 | ac/1 | mc/6 | md/2 | |
| B | aa/2 | ac/1 | ah/2 | mc/5 | md/1 | |
| C | ad/1 | af/2 | ag/1 | mc/7 | md/1 | mb/2 |
| D | ac/2 | ad/1 | ag/1 | mc/8 | md/1 | |
| E | ac/1 | ad/2 | af/3 | mc/4 | | |
| F | ac/1 | ad/2 | ag/1 | me/2 | md/1 | |
| G | ab/1 | ac/1 | ah/1 | me/4 | md/1 | mb/4 |
| H | ab/1 | ah/1 | aj/1 | me/4 | md/1 | mb/2 |
| J | ab/1 | af/3 | | mc/5 | md/1 | |
| K | ab/1 | af/3 | | me/5 | | |
| N | ac/3 | ag/2 | | mc/2 | md/1 | mb/1 |
| P | aa/4 | ac/1 | | | md/4 | |
| Q | aa/2 | ad/1 | aj/1 | mk/4 | mg/2 | |
| R | aa/3 | aj/1 | | mf/5 | | |
| Controls | | | | | | |
| a | mf/2 | mg/1 | | | | |
| b | mg/1 | — | | | | |
| c | mf/1 | | | | | |
| d | mc/12 | md/1 | | | | |
| f | mc/5 | md/1 | mb/3 | ma/1 | | |
| g | mc/3 | md/1 | mb/2 | | | | ma) No. 3 Alkyd resin
mb) Hydroxyl terminated polybutadiene (Arco poly BD45HT)
mc) 12 wt % Cobalt naphthenate
md) 6 wt % Manganese naphthenate
me) Divinyl benzene
mf) Cumylphenyl acetate (Kenrich)
mg) Biphenylphenyl ether (Dow)
mk) Diallyl phthalate Three percent by weight of each of the above concentrates were added to the alkyd ink and, using conventional lithographic processing, were applied to a series of substrates.

The printing press used was a standard single color A.B. Dick Model 360 copier, using a standard offset spray powder attachment. No extra or special adjustments were used. This press includes an integrated dampening system using 10% isopropyl alcohol in the dampening solution. In all test cases the alcohol was omitted.

The press operates on the offset principle; i.e., the ink is carried from the ink fountain by means of a series of inking rollers to a presensitized printing plate which is mounted on an impression cylinder. The ink is deposited as a thin film onto the ink-receptive portion of the printing plate. The impression cylinder revolves and deposits the inked image onto a second cylinder covered with a rubber blanket. The rubber blanket cylinder revolves and deposits the inked image onto the substrate. To produce a clear printed image, the printing plate must reject ink receptivity in the non-image area. This is accomplished by applying a thin film of water to the non-image area of the printing plate by means of a series of rollers which carry the water to the plate in unison with the ink.

The results are shown in Table II below:

TABLE II

| Additive Concentrate | Dry to Touch - MR | Wetting Angle | Tape Test | Rub Resistance |
| --- | --- | --- | --- | --- |
| CLEAR RIGID PVC SHEET (Extruded & tin stabilized) | | | | |
| None | >24 | >45 | F | <10 |
| Control d | 22 | >45 | F | <10 |
| A | 3 | <20 | P | >50 |
| B | 4 | <20 | P | >100 |
| C | 6 | <20 | P | >50 |
| D | 8 | <30 | P | >50 |
| CLEAR ACRYLIC SHEET (Polymethylmethacrylate homopolymer) | | | | |
| None | >24 | >30 | F | <10 |
| Control d | 21 | >30 | F | <20 |
| A | 3 | <20 | P | >50 |
| B | 4 | <20 | P | >70 |
| E | 5 | <20 | P | >50 |
| F | 7 | <20 | P | >60 |
| WHITE POLYESTER SHEET (2 wt % rutile TiO$_2$ modified polyethylene terephthalate) | | | | |
| None | >24 | >45 | F | <10 |
| Control c | 22 | >45 | F | <20 |
| B | 4 | <20 | P | >50 |
| E | 6 | <30 | P | >50 |
| G | 7 | <20 | P | >50 |
| ALUMINUM FOIL (No. 1 mill finish) | | | | |
| None | >24 | >45 | F | <10 |
| Control d | >24 | >45 | F | <10 |
| A | 3 | <30 | P | >30 |
| C | 7 | <30 | P | >50 |
| E | 6 | <30 | P | >30 |
| CHROME COATED PAPER STOCK | | | | |
| None | 21 | >45 | F | <30 |
| Control d | 17 | >30 | M | <30 |
| C | 4 | <20 | P | >50 |
| D | 6 | <20 | P | >50 |
| G | 4 | <20 | P | >50 | a) 50% relative humidity, 75° F. Tape test (ASTM D3359). P = Pass, F = Fail, M = Marginal
b) Two printed surfaces rubbed to illegibility after drying for 48 hours.

The utility of selected additive concentrates of the instant invention for the improvement of adhesion, drying rate, wetting ability and abrasion resistance of alkyd lithographic ink on a variety of non-porous substrates is clearly demonstrated by the above data.

EXAMPLE II

This example describes the enhanced utility of the additive concentrates of the instant invention when added to alkyd-based lithographic inks prior to pigment grind.

A 100% solids 30 wt % diarylide yellow ink was prepared by three times milling of the pigment in a solution of 7 wt % of the indicated additive concentrate in a No. 5, 100% solids China Oil-based alkyd to produce an ink having a viscosity of 40,000 to 55,000 cps. To formulate the ink without the additive concentrate or with a control, it was necessary to use 25 wt % of a No. 3 China alkyd in order to produce an acceptable viscosity ink. These inks were used in standard lithographic processing and the results are given in Table III:

TABLE III

| Additive Concentrate | Hegman Grind | Dry to Touch. Hrs. | Tape Test | Rub Resistance | UV/Corr Resist. |
| --- | --- | --- | --- | --- | --- |
| CLEAR POLYSTYRENE | | | | | |
| B | 7 | 8 | P | >20 | >200 |
| D | 7 | 7 | P | >30 | >200 |
| E | 7 | 7 | M | >50 | >200 |
| G | 7 | 6 | P | >50 | >300 |
| H | 6 | 4 | P | >50 | >500 |
| K | 7 | 4 | P | >50 | >500 |
| N | 7 | 5 | P | >60 | >500 |
| None | 4 | >24 | F | <10 | <100 |
| Control a | 5 | >24 | F | <20 | <200 |
| Control f | 5 | >24 | F | <20 | <200 |
| ALUMINIZED MYLAR | | | | | |
| A | 6 | 7 | P | >20 | >500 |
| E | 7 | 7 | P | >50 | >500 |
| H | 6 | 4 | P | >50 | >500 |
| K | 7 | 4 | P | >50 | >500 |
| N | 7 | 4 | P | >70 | >500 |
| P | 7 | 2 | P | >70 | >500 |
| None | 4 | >24 | F | >20 | <200 |
| Control d | 5 | >24 | F | >20 | <200 |
| Control f | 5 | >24 | F | <30 | <200 |
| Control g | 6 | 22 | M | <30 | <300 | a) See footnote Table II
b) See footnote Table II
c) QUV Cabinet at 100° F.

The above data clearly show the benefits of the additive concentrates of the instant invention with respect to dry time, adhesion and corrosion resistance when added prior to pigment grind to the lithographic alkyd ink.

EXAMPLE III

This example teaches the utility of the selected additive concentrates of the instant invention in conjunction with polyester ink lithography. A commercial black polyester lithographic ink was modified by addition of (unless otherwise indicated) 1 part of selected additive concentrates to 9 parts ink and applied to 10 mil 80 durometer flexible polyvinyl chloride and/or to 12 mil corona treated high density polyethylene sheet stocks. The results are given in Table IV:

TABLE IV

| Additive Concentrate | Dry to Touch. Hrs. | Tape Test | Rub Resistance |
| --- | --- | --- | --- |
| FLEXIBLE PVC | | | |
| None | 10 | F | <20 |
| Control a/2 | 10 | F | <30 |
| Control b/2 | 11 | M | <30 |
| A/Z | 7 | P | >50 |
| B/Z | 6 | P | >50 |

TABLE IV-continued

| Additive Concentrate | Dry to Touch, Hrs. | Tape Test | Rub Resistance |
|---|---|---|---|
| C/Z | 7 | P | >40 |
| Q/Z | 5 | P | >50 |
| R/Z | 4 | P | >100 |
| R/0.5 | 5 | P | >70 |
| R/0.2 | 6 | P | >50 |
| HIGH DENSITY POLYETHYLENE | | | |
| None | 10 | F | >10 |
| Control a/z | 11 | M | >20 |
| Control b/z | 11 | F | >20 |
| A/Z | 8 | P | >30 |
| A/0.5 | 7 | P | >20 |
| Q/Z | 5 | P | >50 |
| Q/0.5 | 6 | P | >30 | a) Where indicated, parts by weight per 100 parts of ink

The data given in Table IV clearly show that the additive concentrates of the instant invention may be employed even at low levels to significantly improve the lithography of non-porous surfaces.

EXAMPLE IV

This example teaches the utility of the additive concentrates of the instant invention in the production of high solids (low volatiles) lithographic acrylic ink.

Red acrylic inks were prepared by three times roll milling 25 wt % on acrylic solids of rubine red in a solution of 30 wt % acrylic resin (Rohm & Haas B66) in xylene (containing the indicated wt % of the selected additive concentrate on acrylic solids), followed by dilution to 50,000±500 cps Brookfield viscosity with incremental xylene. By lithographic application, the inks were applied to prismatic foil and galvanized steel sheetstocks. The results of these runs are in Table V:

TABLE V

| Additive PKG/PHA | Hegman Grind | % Xylene in Finished Ink | Dry to Touch, Hrs. | Tape Test | Rub Resistance |
|---|---|---|---|---|---|
| PRISMATIC FOIL | | | | | |
| None | 5 | 77 | 7 | F | <30 |
| Control a/z | 6 | 73 | 8 | F | <50 |
| Control b/z | 6 | 74 | 8 | M | <50 |
| A/2 | 6 | 67 | 5 | P | <90 |
| A/0.5 | 6 | 68 | 5 | P | <90 |
| B/2 | 6 | 65 | 5 | P | <70 |
| B/0.5 | 6 | 65 | 5 | P | >70 |
| B/0.1 | 6 | 65 | 5 | P | >70 |
| R/2 | 7− | 64 | 4 | P | >100 |
| R/0.5 | 7+ | 65 | 4 | P | >100 |
| GALVANIZED STEEL | | | | | |
| None | | | 7 | F | <30 |
| Control b | | | 8 | F | <50 |
| R/2 | | | 4 | P | >100 |
| R/0.5 | | | 4 | P | >100 |
| R/0.1 | | | 4 | P | >80 |

The data in Table V clearly demonstrate that the introduction of selected additive concentrates of the instant invention may be employed to significantly reduce solvent emissions, enhance pigment grind, improve adhesion and reduce abrasion resistance in acrylic lithographic ink applications.

We claim:

1. A composition useful for enhancing the performance of printing ink which comprises an admixture comprising an organophosphate-titanate and an orgaophosphate-zirconate and a resin or resin precursor vehicle.

2. The composition of claim 1 wherein the organometallic compounds are in a ratio of from 10:1 to 1:10.

3. The composition of claim 1 wherein each organometallic compound is present in from 1 to 30 wt % in said resin vehicle.

4. The composition of claim 1, wherein the vehicle additionally comprises a drier or drier combination.

5. The composition of claim 4 wherein the drier is a metal soap of a higher fatty acid.

6. The composition of claim 4 wherein the drier is a cobalt naphthanate.

7. A printing ink composed of solids dispersed in liquid components which contains an admixture of an organophosphate-titanate, an organophosphate-zirconate, and a resin or resin precursor vehicle.

8. The printing ink of claim 7 wherein from 0.1 to 3% of each of the organo-metallic compounds are present based on the solids in said ink.

9. A printing ink composition containing an alkyd resin vehicle in admixture with 0.1 to 3% of each of an organophosphato-titanate and an organophosphato-zirconate.

10. The printing ink of claim 9 wherein the composition contains up to 80% pigment.

11. The printing ink of claim 9 wherein the composition contains a metal soap of a higher fatty acid as a drier.

12. The printing ink of claim 11 wherein the drier is cobalt naphthanate.

13. The printing ink of claim 8 wherein the alkyd resin has a viscosity of from 2500 to 10,000 centipoise.

14. The printing ink of claim 8 wherein the organophosphate-titanate and the organophosphato-zirconate may each be represented by the formula:

$$A_y^1 M B_{4-y}^1 \text{ where } y = 1, 2 \text{ or } 3 \quad (I)$$

$$A^2 M B_2^1 \quad (II)$$

$$A_1^1 M B_1^1 B_1^2 \quad (III)$$

$$A_1^1 A_1^2 M B_1^1 \quad (IV)$$

$$A^2 M B^2 \quad (V)$$

$$A_2^1 M B^2 \quad (IV)$$

where M = Ti or Zr;

$A^1 = (RO)_a$, wherein R is an unsubstituted or ether-substituted alkyl, alkenyl, or aralkyl group having less than 20 carbon atoms;

$A^2 = -O(CR^1R^2)_b(CO)_cO-$, wherein $R^1$ and $R^2$ are independently selected from hydrogen and unsubstituted or ether-substituted alkyl, alkenyl, aralkyl, aryl or alkaryl having less than 20 carbon atoms, b is 1 or 2 and c is 0 or 1;

$B^1 = -OP(O)(OR^4)(OR^5)$;
$-OP(O)(OR^4)(OR^5).L$;
$-OP(O)(OR^6)-O-P(O)(OR^7)(OR^8)$; or
$-OP(O)(OR^6)-O-P(O)(OR^7)(OR^8).L$ wherein $R^4$ and $R^5$ are independently selected from unsubstituted or ether-substituted alkyl, alkenyl, aralkyl, aryl or alkaryl having less than 20 carbon atoms per molecule; $R^6$; $R^7$ and $R^8$ are the same as $R^4$ and $R^5$ except that one and only one of $R^6$, $R^7$ and $R^8$ is hydrogen; and L is a diester phosphite having less than 40 carbon atoms or an unsaturated tertiary amine or derivative thereof having less than 20 carbon atoms; and $B^2$ is —OP(O)(OR$^3$)OP(OR$^3$)O— wherein R$^3$ is as defined for R$^4$ and R$^5$ above.

15. In a process for applying printing ink to a substrate by lithographic processing, the improvement of: applying to a substrate a printing ink containing an organophosphato-titanate and an organophosphato-zirconate.

16. The process of claim 15 wherein the substrate is a non-porous material.

17. The process of claim 16 wherein the non-porous material is a polymeric or metallized substrate.

18. A printed article which comprises a substrate having printed thereon an ink containing an organophosphato-titanate and an organophosphato-zirconate.

19. The printing ink of claim 7 which is substantially devoid of fatty acids.

20. The composition of claim 5 wherein the metal soap ranges from 0.5 to 20% by weight of metal ion.

21. An admixture for a rapidly drying, highly adhesive and solventless printing ink comprising organophosphate-titanate and organophosphate-zirconate in a resin vehicle.

* * * * *

UNITED STATES PATENT AND TRADEMARK OFFICE
CERTIFICATE OF CORRECTION

PATENT NO. : 5,116,411
DATED : May 26, 1992
INVENTOR(S) : Michael W. O'Neill and Gerald Sugerman It is certified that error appears in the above-indentified patent and that said Letters Patent is hereby corrected as shown below:

column 10, line 45, the formula is incorrectly shown as "(IV)" it should be -- (VI) -- ;

column 11, line 5, the formula reads:

"$B^2$ is -OP(O)(OR$^3$)OP(OR$^3$)O- wherein $R^3$ is as" it should read: -- $B^2$ is -OP(O)(OR$^3$)OP(O)(OR$^3$)O- wherein $R^3$ is as -- .

Signed and Sealed this

Twenty-fourth Day of August, 1993

Attest:

BRUCE LEHMAN

*Attesting Officer*         *Commissioner of Patents and Trademarks*